United States Patent [19]

Fasulkey et al.

[11] Patent Number: 5,295,323
[45] Date of Patent: Mar. 22, 1994

[54] HUMANE ANIMAL TRAP

[76] Inventors: Robert H. Fasulkey; John Gerding, both of P.O. Box 20411, Towson, Md. 21284

[21] Appl. No.: 34,767

[22] Filed: Mar. 19, 1993

[51] Int. Cl.$^5$ ............................................. A01M 23/34
[52] U.S. Cl. ............................................. 43/85; 43/87
[58] Field of Search .................... 43/85, 86, 87, 88, 65, 43/67, 58

[56] References Cited

U.S. PATENT DOCUMENTS

| | | | |
|---|---|---|---|
| 2,481,800 | 9/1949 | Tyler | 43/85 |
| 3,965,607 | 6/1976 | Lee | 43/87 |
| 4,208,827 | 6/1980 | Starkey | 43/87 |
| 5,157,863 | 10/1992 | Godwin | 43/85 |

*Primary Examiner*—Kurt C. Rowan
*Assistant Examiner*—Chuck Y. Mah

[57] ABSTRACT

This invention relates to a humane animal live trap for application to the immobilizing of various animals and mammals. The device consists of a generally vertically positioned, compressed sleeve or cylindrical body of a generally resilient interwoven spring-like stranded material forming by strands interwoven at acute angles with each other a hollow doubly tapered cylindrical opening the sleeve is adapted to elongate when the trigger is actuated and the compressed sleeve is released by the sleeve guards, from its state of compression and circumvallates the animal or animal part that entered in to the hollow sleeve with its central tapered cylindrical opening, and tripped the trigger located centrally at the sleeve bottom. The sleeve is comprised of a loop series which is formed by the upper ends of the resilient strands, to allow compressing and depressing of the centrally doubly tapered cylindrical opening to release the captured animal and reset the trap sleeve.

12 Claims, 1 Drawing Sheet

HUMANE ANIMAL TRAP

BACKGROUND OF THE INVENTION

1. FIELD OF INVENTION

This invention relates to a humane animal live trap for application to the immobilizing of various animals and mammals. The device consists of a generally vertically positioned, compressed sleeve or cylindrical body of a generally resilient interwoven spring-like stranded material forming by strands interwoven at acute angles with each other a hollow doubly tapered cylindrical opening the sleeve is adapted to elongate when the trigger is actuated and the compressed sleeve is released by the sleeve guards, from its state of compression and circumvallates the animal or animal part that entered in to the hollow sleeve with its central tapered cylindrical opening, and tripped the trigger located centrally at the sleeve bottom. The sleeve is comprised of a loop series which is formed by the upper ends of the resilient strands, to allow compressing and depressing of the centrally doubly tapered cylindrical opening to release the captured animal and reset the trap sleeve.

This provides accessing and automatic tightening of the sleeve around the paw or extremity of the animal and thus immobilizing the animal or animal part that has been inserted therein. To facilitate the removal of the animal or part from the sleeve, which sleeve has a longitudinal dimension being slightly lesser in distance than the overall distance between a the part of the animal to be trapped and its body.

A slight compression of the trigger against its resilient characteristic position releases the sleeve restraint bar slide from its compressed condition, which in turn allows the sleeve to receive and immobilize the animal or animal part. Using the principal of the well known "Chinese finger trap", the lateral forces of resilient strands of the sleeve hug the animal part (foot, paw, or other extremity). The sprung trap hugs and restrains the animal part with uniform circular and diagonal pressing. This provides distribution of the compressive forces uniformly over the outer surface of the animal part, in a manner circumvallates the trapped animal or animal part, thus avoiding any of the painful and often damaging action of prior art type, "bear trap" two high pressure point, traps.

The term "circumvallate" in Webster is defined as something being surrounded by or as if by a rampart, specially enclosed by a ridge, wall or material; and is defined in Steadman's Medical Dictionary (1982) as denoting a structure surrounded by a wall, as the circumvallate papillae of the tongue.

The invention relates further to a method of making device comprising the steps of; forming a resilient clamping sleeve or cylindrical body of a generally resilient stranded material having and forming a double tapered open center sleeve adapted to circumvallate the animal part, by an action of natural springing extension and resultant diminution of the circumference of the double helix formed sleeve. This provides a series of uniformly radially disposed intertwined sleeve forming strands extending along at least one axis element thereof to provide spring-like urging of the extension of the sleeve toward and constrictingly around the animal part or its supporting member. A slight compression of the trigger, against its resilient characterization and tending to release the sleeve from its compressed condition, which in turn allows the sleeve that has a lower section with a LARGER diameter and has a middle section with a smaller diameter and the upper section that has the upper end section with a LARGER opening formed of sufficient size to receive the animal or animal part. Using the principal of the well known "Chinese finger trap", the lateral forces of resilient hugging of the animal part (foot, paw, or other extremity) by the resilient strands forming the sleeve, the sprung trap hugs and restrains the animal part with uniform circular and diagonal pressing.

This provides distribution of the compression forces uniformly over the outer surface of the animal part. To effect a slight compression of the sleeve against its resilient character and tendency in locus around and against the periphery of the animal or animal part trapped, can cause the release of the animal, as more particularly described herein.

DESCRIPTION OF PRIOR ART

The prior art of live animal trapping devices and the like, as well as apparatus and method of their construction in general are found to be known, and generally show various spring clamping elements. In the art there is the whole animal box type known and used from frontier days to this date. One manufacturer of such traps is known as "HAVE-A-HART". Both as to structure and function there is nothing similar except the very broad general purpose of trapping an animal. Another type of trap that is old in the art is the "Bear Trap" type, which comprises usually two "D" shaped clamping devices that are spring urged. This trap is generally known to be less than humane and by its operation of the two "D" shaped clamps which presses painfully and damagingly on primarily two contact points of the paw foot or other part of the trapped animal.

These historic animal traps have the distinct disadvantage that they do not lend themselves to humane and simple application to the capture of animals by parts. An automatic compressive two point method of holding the animal or animal part is a distinct disadvantage both as to humaneness and as to damage to the captured animal.

No references were found to be similar enough in structure or function to be of interest:

The patents on "Chinese finger puzzle" like devices, and cable pullers while in totally different areas of art, have a structure that is in some ways similar to the sleeve portion of this subject device, taken as a whole are not similar enough to be an anticipation. The known uses teach and disclose various types of animal traps, and show various sorts of manufactures as well as methods of their construction, but none of them whether taken singly or in combination disclose the specific details of the combination of the invention in such a way and to significantly bear upon the claims of the present invention. Close approach to the present inventive structure was not observed in the above cited references. Accordingly, the devices cited above and their references should be considered as being of general interest and illustrative of the scope of the available art but not anticipatory.

SUMMARY OF THE INVENTION

An object, advantage and feature of the invention is to provide a humane animal trap device that captures or restrains or checks the foot or toe or other portion of the animal body in a multiple 20, 30 or more point contact and thus cushions the impact and thus minimizes or eliminates damage or injury to the trapped animal.

Another object of the invention is directed further to a device providing for the uniform multipoint distribution of the animal clamping force thereby preventing even accidental damaging contact between the animal body parts and the trap and also the method of construction thereof.

The invention relates further to a method of making device comprising the steps of; forming a resilient clamping sleeve or cylindrical body of a generally resilient stranded material having and forming a double tapered open center sleeve adapted to circumvallate the animal part, by an action of natural springing extension and resultant diminution of the circumference of the double helix formed sleeve. Providing a series of uniformly radially disposed intertwined sleeve forming strands extending along at least one axis element thereof to provide spring-like urging of the extension of the sleeve toward and constrictingly around the animal part or its supporting member. Providing a source of slight compression of the trigger, AGAINST its resilient force element and tending to release the sleeve from its compressed condition, which in turn allows the sleeve that has a lower section with a LARGER diameter and has a middle section with a smaller diameter and the upper section that has the upper end section with a LARGER opening formed of sufficient size to receive the animal or animal part. Using the principal of the well known "Chinese finger trap", the lateral forces of resilient hugging of the animal part (foot, paw, or other extremity) by the resilient strands forming the sleeve, the sprung trap hugs and restrains the animal part with uniform circular and diagonal pressing.

This provides distribution of the compression forces uniformly over the outer surface of the animal part. To effect a slight compression of the sleeve against its resilient character and tendency, in locus around and against the periphery of the animal or animal part, trapped, can cause the release of the animal as more particularly described herein. The actuation of this device can not harm any human or restrain that which it is not sized to catch.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE PREFERRED EMBODIMENT/S

Figure 1:
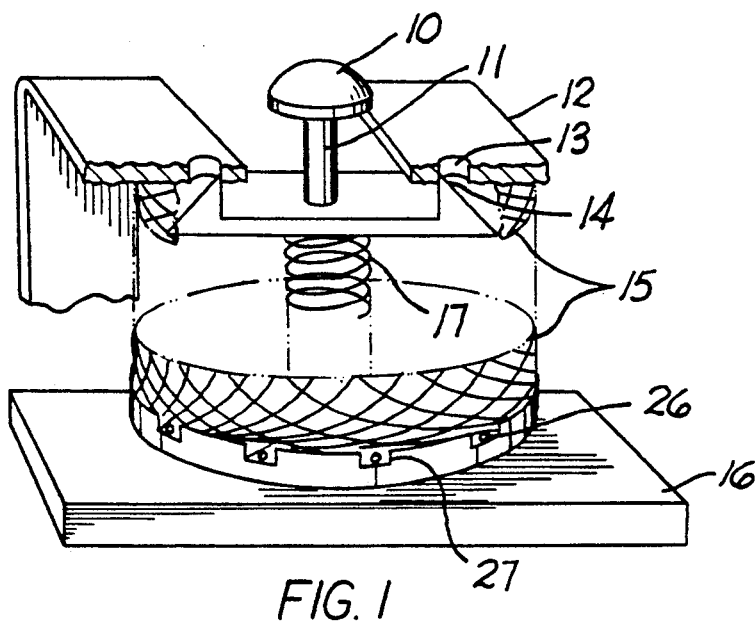
FIG. 1, is an isometric view (part cut away) of the trap in the compressed condition (not sprung). This illustrating a typical device according to the preferred embodiment and best mode of the invention
Figure 2:
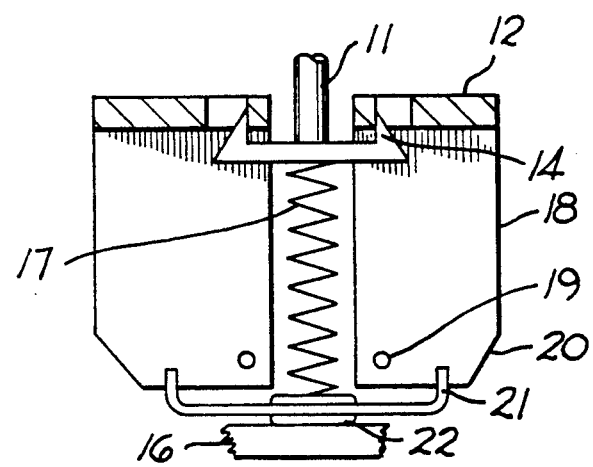
FIG. 2, is a partial cut away view of the details of the triggering device.
Figure 3:
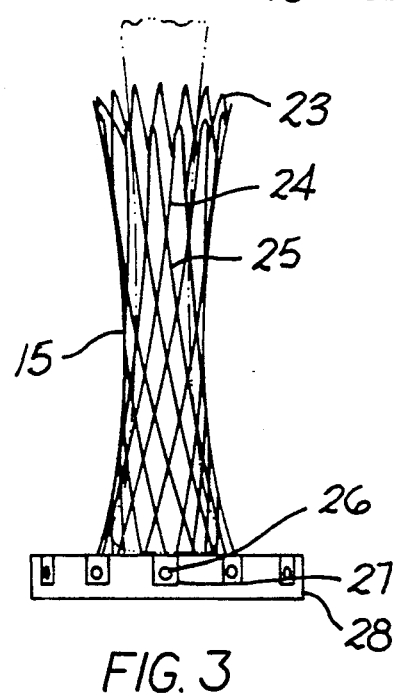
FIG. 3, is an isometric view of the trap sleeve in the extended condition (sprung). This illustrating (stylized) a typical sleeve according to the preferred embodiment and best mode of the invention

Referring to FIG. 1, the trap is shown generally in the compressed or set position, where the bed or base 16, of the device has mounted thereon a pocketed ring 28 to receive in the ferrule pockets 27, which are formed to receive the end ferrules 26 of the clockwise arcuate and the counter clockwise arcuate, spring elements 24, and 25, FIG. 3, respectively, the clockwise elements and the counterclockwise elements are formed of a single strand of stainless spring steel, brass or plastic bent in a "U" shape and interwoven with other similar loops and their free ends are joined at the lower end by a ferrule 26. This, 15, is shown in part, in the compressed condition, in FIG. 1. There is concentrically within the spring sleeve 15, a smaller trigger keeper spring 17, which urges the keeper 14, upwardly so that the points of the keeper enter the keeper openings and engage the keeper seat 13, and retain the sleeve restraint bars 12, in the cocked position which in turn restrains the sleeve 15, in the cocked position. Light pressure on the keeper trigger 10, through trigger shaft 11, on to the keeper 14, causes it to release the sleeve restraint bars 12, which are actuated apart by a spring, (in a known manner) from each other and thus away from the top of the compressed sleeve 15, releasing it and allowing it to extend itself, as shown in FIG. 3 and surround the object that actuated the trigger 10.

Cocking the trap-The trap sleeve 15, is compressed by pushing downward on the sleeve opening 23, until fully compressed, and then the two sleeve restraint bars 12, are pushed toward each other and over the compressed sleeve 15, and thus engage the sleeve to restrain its natural springiness. Simultaneously the trigger 10, is first depressed and then released so that the keeper 14, points may enter the keeper seat openings 13, and hold fast the sleeve restraint bars 12. This is accomplished by allowing the keeper 14, to return to its original at rest position. This action holds the sleeve restraint bar 12, in position to keep the bars restraining the sleeve 15, and holds the restraint bars 12, from springing apart due to the urging of the restraint bar actuator 22, which would result in the release of the sleeve, 15. Thus the trap is set.

When an object such as an animal paw or similar elongated object, contacts the keeper trigger 10, and the force to the contact is transmitted through the trigger shaft 11, and this force opposes and overcomes the force of the keeper spring 17, the keeper points 14, release the sleeve restraint bar 12, which in turn releases the sleeve 15, which accelerates upwardly and the co-action of the Clockwise 24, and the counter clockwise 25, arcuate elements surround the object and restrict the removal of the object. Due to the nature of this counter rotational arced meshed sleeve the harder the object is tried to be released from the grip of the sleeve 23, also called the Chinese finger puzzle, the more firm the grip. Also, the uniform and evenly distributed loading of the gripping forces, is such that it does practically no damage to the object. This is not true of the other paired element, and snare traps. The sleeve restraint bars 12, and the sleeve restraint bars side 18, have a pivot opening 19, which is attached to a bar pivot (not shown) and to a spring 22, sleeve restraint bar actuator 21, which urges the sleeve restraint bars 12, apart from each other. The keeper 14, holds the sleeve restraint bars 12, together and over and restraining the sleeve 15, in its cocked or compressed position, until the trigger 10, is depressed or tripped.

I claim,

1. A humane animal trap device comprising
   a base mounted vertical cylindrical sleeve means constructed of multiple arcuate clockwise and counter clockwise elements of looped resilient material positioned substantially parallel to a single axis and interwoven at an acute angle to form in the relaxed position a hollow double conical cylindrical sleeve, capable of being compressed to form a shorter cylinder of larger diameter than that of the relaxed sleeve,
   said sleeve means having a longitudinal dimension, relaxed, being slightly lesser in distance than the overall distance between the extremity of the animal part to be caught and the parts attachment to the body of the animal.
   a restraining means constructed of two pivoted restraining bars of a dimension sufficient to hold the cylindrical sleeve in its compressed position, and having an opening in each bar to act as a keeper seat,
   a spring power means constructed of resilient coiled spring wire, connected to the restraining bars to urge the bars away from each other and out of the way of the compressed sleeve,
   a trigger means constructed with at least two keeper points constructed to selectively, hold the sleeve in the compressed condition until the trigger is depressed, operating to release the bars which in turn release the sleeve, allowing the sleeve to automatically elongate and constrict around retaining the object actuating the trigger.

2. The apparatus of claim 1 wherein the sleeve means has a lower section with a larger diameter at the lower section and has middle section with a smaller diameter at the middle section an upper section with a larger diameter to provide constriction by even distribution of the compression within the sleeve.

3. The apparatus of claim 1 wherein the sleeve means is a woven pre stressed material.

4. The apparatus of claim 1 wherein the sleeve means is of an elastomeric material.

5. The apparatus of claim 1 wherein the sleeve means is of a metallic material.

6. The apparatus of claim 1 wherein the sleeve means is of a plastic material.

7. Method of making a humane animal trap device comprising the steps of
   forming a base mounted sleeve means of generally resilient material having a hollow center and adapted to circumvallate the object to be trapped,
   providing radially disposed resilient elements in a compressible cylindrical sleeve means extending along at least one radius thereof to provide an open cylindrical constrictable sleeve means, to constrict and conform onto the object to be trapped and for its removal thereof, and
   providing a longitudinal dimension of the sleeve means that is slightly lesser than the overall distance between the animal part extremity and its connection to the animal,
   providing a trigger releasable sleeve constraining means to releasably restrain the sleeve means in the compressed condition,
   effecting a slight compression on the sleeve means due to its resilient characterization and tending to retain the sleeve means in locus between the sleeve constraining means, and the base.

8. The method of claim 7 wherein the sleeve means has a lower section with a larger diameter at the lower section and has a middle section with a smaller diameter and an upper section with a larger diameter to provide distribution of the constriction within the sleeve.

9. The method of claim 7 wherein the sleeve means is a metallic material.

10. The method of claim 7 wherein the sleeve means is of an elastomeric material.

11. The method of claim 7 wherein the sleeve means is of a memory retaining material.

12. The method of claim 7 wherein the sleeve means is adapted to fit the animal part actuating the trigger mechanism.

* * * * *